United States Patent [19]

Nakada et al.

[11] Patent Number: 4,909,108
[45] Date of Patent: Mar. 20, 1990

[54] MECHANICAL HAND FOR PROCESSING EDGES OF A CURVED PLATE AND AN APPARATUS FOR PROCESSING THE EDGES OF THE CURVED PLATE

[75] Inventors: Michiharu Nakada; Koichiro Nakai, both of Yokohama, Japan

[73] Assignee: Asahi Glass Company Ltd., Tokyo, Japan

[21] Appl. No.: 199,281

[22] Filed: May 26, 1988

[30] Foreign Application Priority Data

May 29, 1987 [JP] Japan .............................. 62-131343

[51] Int. Cl.[4] ............................................. B23D 53/00
[52] U.S. Cl. ..................................... 83/76.9; 83/789; 83/812; 83/699
[58] Field of Search ............ 83/71, 789, 790, 809–812, 83/699

[56] References Cited

U.S. PATENT DOCUMENTS

| 4,111,085 | 9/1978 | Johnson | 83/801 X |
| 4,579,026 | 4/1986 | Tsune | 83/13 |
| 4,592,261 | 6/1986 | Miyaji et al. | 83/102.1 |
| 4,676,129 | 6/1987 | Blanco | 83/71 |
| 4,713,994 | 12/1987 | Guglielmetti et al. | 83/71 |

FOREIGN PATENT DOCUMENTS

2220 of 1861 United Kingdom .................. 83/811

Primary Examiner—Douglas D. Watts
Assistant Examiner—Eugenia H. Jones
Attorney, Agent, or Firm—Oblon, Spivak, McClelland, Maier & Neustadt

[57] ABSTRACT

A mechanical hand for processing edges of a curved plate is attached to the hand supporting member of a robot arm and in use is moved along the edges of the curved plate, which is made of glass, ceramics, metal or the like. The mechanical hand has a fixed bracket fixed to the hand supporting member; a movable bracket supported by the fixed bracket so as to be capable of tilting around a point of processing which is determined to be on the axial line of the robot arm and which corresponds to part of the edges of the curved plate; a processing tool mounted on the movable bracket to face the part of the edges of the curved plate at the point of processing; and a driving means for causing the movable bracket to tilt so that the posture of the processing tool coincides with a surface of the edges to be processed of the curved plate at the point of processing.

7 Claims, 10 Drawing Sheets

MECHANICAL HAND FOR PROCESSING EDGES OF A CURVED PLATE AND AN APPARATUS FOR PROCESSING THE EDGES OF THE CURVED PLATE

FIELD OF THE INVENTION

The present invention relates to an improvement in a mechanical hand for an industrial robot for processing edges of a curved plate made of a material such as glass, ceramics, metal or the like.

BACKGROUND OF THE INVENTION

As a mechanical hand of the above-mentioned type, there has been known one as disclosed in, for instance, Japanese Unexamined Patent Publication No. 3052/1984.

Figure 11:
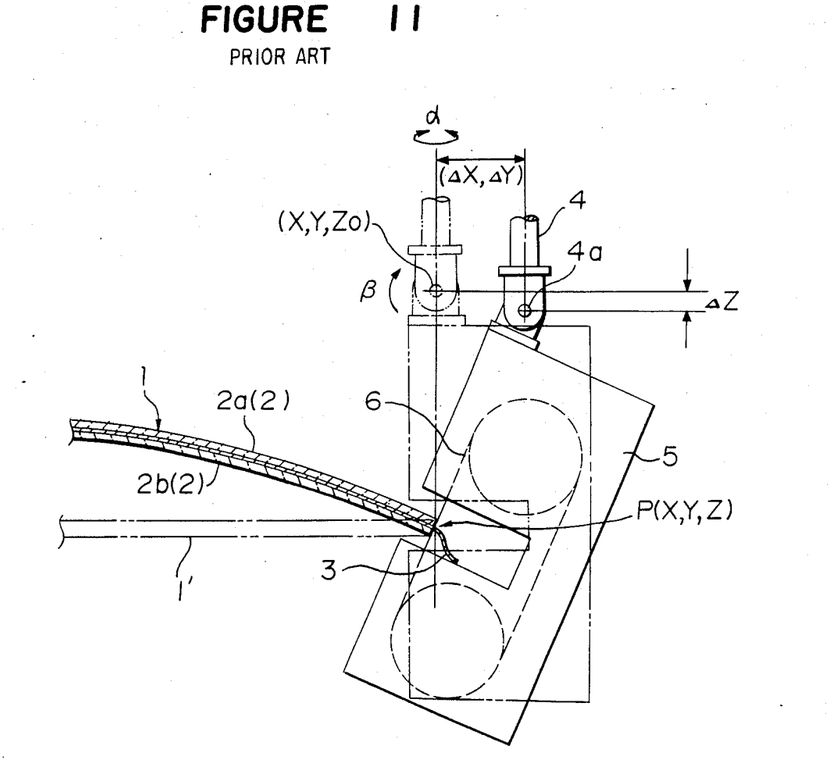
FIG. 11 is a diagram showing a conventional mechanical hand for processing edges of a curved plate.

The mechanical hand is adapted to process a curved plate 1 consisting of two curved glass plates 2 (i.e. 2a and 2b) and an intermediary film 3 interposed between the two glass plates; particularly, to cut the end portion of the intermediary film 3 which extends from the end portions of the glass plates as shown in FIG. 11. The basic construction of the mechanical hand is such that a fixed bracket 5 is fixed to a hand supporting member 4a formed at an end of a robot arm 4. A processing tool 6 such as a rotating endless cutting blade is mounted on the fixed bracket 5, whereby the end portion of the intermediary film 3 is subjected to a cutting process at a point of processing P of the processing tool 6 by previously teaching the sequential operations of the robot.

In the conventional mechanical hand for processing edges of the curved plate, when the mechanical hand is mounted on a robot operable in an orthogonal coordinate axis system to cut the edge of the intermediary film 3, if a flat plate 1' as indicated by an imaginary line is to be processed for cutting of its edge portion, it is sufficient that, as shown by another imaginary line in FIG. 11, each coordinate point (X, Y, Zo in FIG. 11) of the hand supporting member 4a of the robot arm 4 corresponds to each coordinate point (X, Y, Z in FIG. 11) of the point of processing P. However, when the end portion of the curved plate 1 is to be cut, it is insufficient to obtain an expected result by specifying a position in the coordinate system for the hand supporting member 4a, and it is necessary to determine the posture in tilting of the processing tool 6 so as to correspond to an angle of inclination of the edge portion of curved plate 1. Accordingly, it is necessary to specify an angle of rotation $\alpha$ around the axial line (corresponding to the Z axis) and an angle of rotation $\beta$ around an axis orthogonal to the axial line of the hand supporting member 4a of the robot arm 4.

Under such circumstances, in order to tilt the processing tool 6 by the angle of rotation $\beta$ at a position where the processing tool 6 is rotated by the angle of rotation $\alpha$ to thereby conduct a teaching operation for the robot, it is necessary to adjust the coordinate points (X, Y, Zo) of the hand supporting member 4a in correspondence to each factor of displacement $\Delta X$, $\Delta Y$ and $\Delta Z$ in addition to tilting the hand supporting member 4a of the robot arm 4 by the angle of rotation $\beta$. This causes a complicated teaching operation because a locus in the teaching operation of the hand supporting member 4a can not be utilized for processing the edge portion of the curved plate 1.

When the processing tool 6 is tilted in the operations of an industrial robot, it is sometimes necessary to limit an acceleration speed in each movement so as to stabilize the tilting movement of the processing tool because the movement of rotation of the hand supporting member 4a should be in association with the movements of displacement of the hand supporting member 4a in the coordinate system. The limitation of the acceleration speed of the hand supporting member 4a takes much time for processing the edge portion of the curved plate by the processing tool 6. Further, it is difficult to follow the posture of the processing tool in accordance with a sharp change in an angle of inclination of an edge portion of the curved plate 1 to be processed.

OBJECT OF THE INVENTION

It is an object of the present invention to provide a mechanical hand for processing edges of a curved plate which allows easy teaching operations for a robot and a high speed processing for the curved plate and an apparatus utilizing the mechanical hand.

SUMMARY OF THE INVENTION

In an aspect of the present invention, there is provided a mechanical hand for processing edges of a curved plate. The mechanical hand is attached to the hand supporting member of a robot arm and is moved along the edges of the curved plate, and the mechanical hand is characterized by comprising:

a fixed bracket fixed to the hand supporting member;

a movable bracket supported by the fixed bracket so as to be capable of tilting around a point of processing which is determined to be on the axial line of the robot arm and which corresponds to part of the edges of the curved plate;

a processing tool mounted on the movable bracket to face the part of the edges of the curved plate at the point of processing; and a driving means for causing the movable bracket to tilt so that the posture of the processing tool coincides with a surface of the edges to be processed of the curved plate at the point of processing.

In another aspect of the present invention, there is provided an apparatus for processing edges of a curved plate which comprises:

a mechanical hand comprising a fixed bracket fixed to a hand supporting member, a movable bracket supported by the fixed bracket so as to be capable of tilting around a point of processing which is determined to be on the axial line of a robot arm and which corresponds to part of the edges of the curved plate, a processing tool mounted on the movable bracket to face the part of the edges of the curved plate at the point of processing, a driving means for causing the movable bracket to tilt so that the posture of the processing tool coincides with a surface of the edges to be processed of the curved plate at the point of processing, a moving means for moving the mechanical hand along the edges of the curved plate;

a supporting table for supporting the curved plate; and an electrically operable numerical control and driving device.

In the present invention, a curved plate made of a material such as glass, thermoplastic resin, ceramics, metal and so on and having a two or three dimensional curved surface is usable. In such curved plate, any edge portion of the curved plate can be processed.

In the present invention, a curved plate made of a base material such as a glass plate and a film laminated on the base material (the film material may be bonded on a single surface or on both surfaces of the base material, or the film material maybe interposed between two base materials) is usable. In particular, the film material extending from the edge portions of the base material or materials such as an interposed layer of a laminated glass plate is cut. An adhesive or a coating material is applied to the edge portion of the curved plate. Alternatively the edge portion of the curved plate is ground or chamfered.

The movable bracket may be fitted to the fixed bracket in a desired manner so long as movements of the processing tool are not impaired at the point of processing. However, it is preferable that the movable bracket is supported at three or more points so as to be movable along a guide rail having an arcuate track whose center is at the point of the processing, whereby the movable bracket can be tilted in a stable manner.

In order to tilt the movable bracket, a driving means is preferably used. That driving means preferably comprises the combination of an electric motor and gear wheels which transmits a driving force from an actuator to the movable bracket so as to rotate it. However, the movable bracket may be operated by connecting the operating lever of a linearly movable actuator to the movable bracket with an appropriate gap.

The processing tool may be selected depending on a way of processing the edge portion of the curved plate. For instance, a cutting blade may be fixedly or detachably mounted so that a film material extending from the edge portion of the base material is cut. A coating member such as a brush and an adhesive feeder may be provided so that an adhesive is supplied to the curved plate at a suitable amount. A grinding member and a cooling device may be provided to perform grinding or chamfering operation to the curved plate.

The processing tool may be fixedly or detachably attached to the movable bracket by means of a supporting structure or a temporary holding means.

In the present invention, the point of processing of the mechanical hand for processing the edges of the curved plate is determined on the axial line of the robot arm; the movable bracket is supported by the fixed bracket so as to be capable of tilting around the point of processing; and the processing tool is attached to the movable bracket. Accordingly, the posture of the processing tool can be changed by tilting and rotating the movable bracket without causing change of the point of processing in an orthogonal coordinate axis system.

DETAILED DESCRIPTION OF THE PRESENT PREFERRED EMBODIMENTS

Preferred embodiments of the present invention will be described with reference to the drawings.

Figure 4:
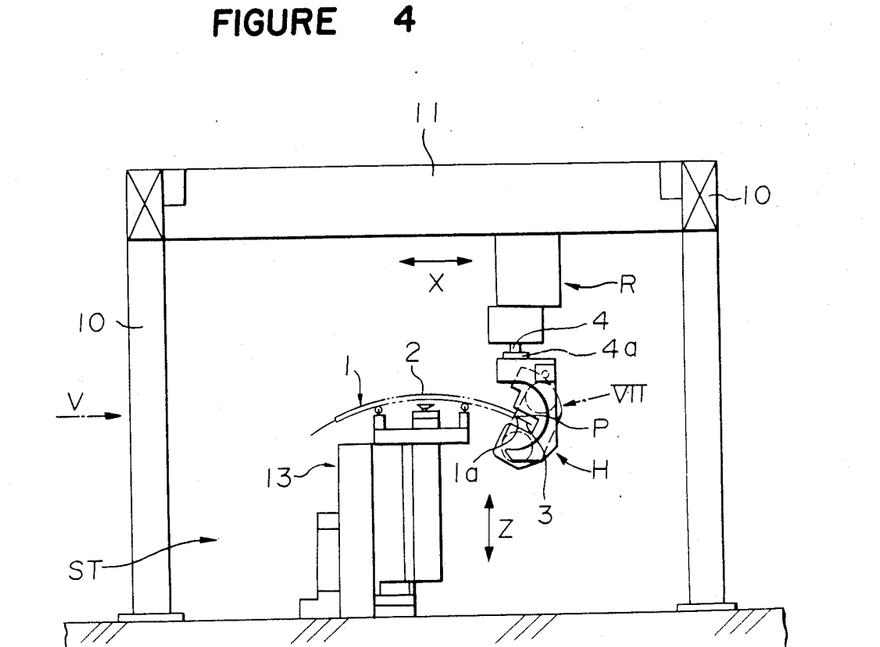
FIG. 4 is a diagram showing an example of a working stage for an industrial robot in which the mechanical hand of the present invention is used.
Figure 5:
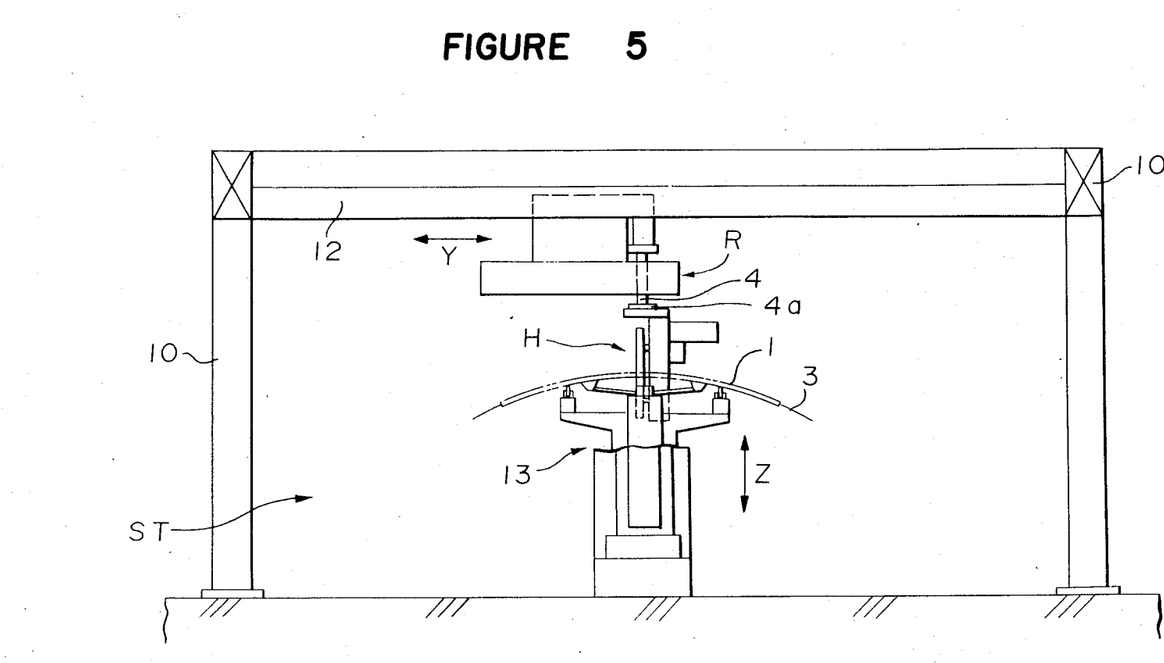
FIG. 5 is a diagram showing the working stage from the view in the direction of V in FIG. 4.
Figure 6:
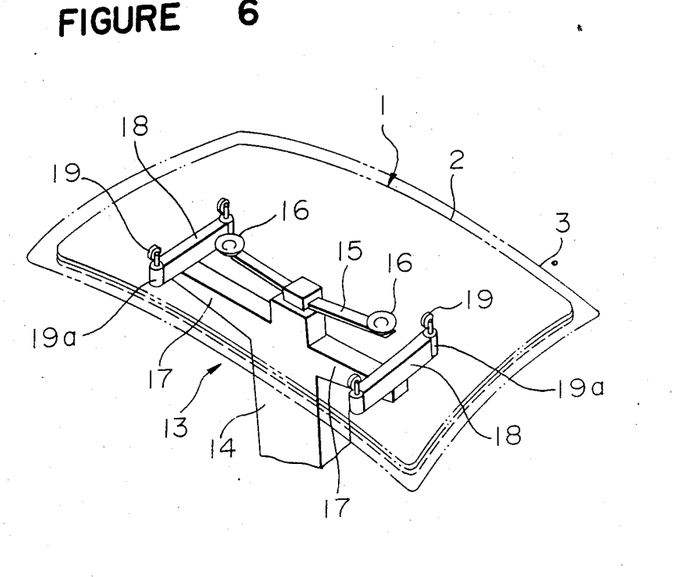
FIG. 6 is a perspective view showing an embodiment of a supporting table for receiving a curved plate in the working stage as shown in FIG. 4.

FIGS. 4 to 6 show an embodiment of a working stage ST for an industrial robot R operable in an orthogonal coordinate axis system. The industrial robot R is adapted to cut the edge portion of an intermediary film 3 extending from an edge of a curved plate 1 which is composed of two laminated glass plates 2 and the intermediary film 3 interposed between the glass plates. An embodiment of the mechanical hand for processing the edge of the curved plate according to the present invention is applied to the industrial robot R.

In this embodiment, the industrial robot R is mounted on an X axis guide frame extending along the direction of X axis of a supporting frame 10 and a Y axis guide frame extending along the direction of Y axis of the supporting frame 10 so as to be freely slidable. The industrial robot R is provided with a robot arm 4 which rotates around the Z axis. A hand supporting member 4a is formed at the top end of the robot arm 4. The hand supporting member 4a is moved in both directions of X axis and Y axis on the basis of a control signal such as an electrically operable control signal with respect to the point of processing P as a teaching point in correspondence to the edge portion of the curved plate 1 to be processed. Also, the hand supporting member 4a is turned at an angle of rotation $\alpha$ by a control signal such as an electrically operable control signal.

A column 14 of a supporting table 13 for receiving thereon the curved plate 1 performs the vertical movement along the Z axis according to a function of the industrial robot R so that it vertically ascends and descends with respect to the point of processing P as the teaching point on the basis of a control signal such as an electrically operable control signal.

As shown in FIG. 6, the supporting table 13 supports the central portion of a curved plate 1. A plate spring 15 is fixed to the upper part of the column 14. A pair of sucking disks 16 are mounted on the ends of the plate spring 15. A pair of arms 17 are formed near the upper end of the column 14. An elongated supporting body 18 is fixedly attached to the end of each of the arms 17. A supporting tip 19 is attached to each end of the supporting bodies 18 through an air cylinder 19a. Thus, the supporting table 13 is so adapted that the curved plate 1 is set on it; the air cylinder 19a is lowered so that supporting tip 19 is lower than the sucking disk 16; the curved plate 1 is connected to the sucking disks 16; and, then, the supporting tip 19 is raised by operating the air cylinder 19a, whereby the curved plate 1 is supported at four points by means of the supporting tips 19 while it is secured to the sucking disks 16 by the aid of the spring action of the plate spring 15. Then, the column 14 is moved vertically by feeding a control signal when the robot is to be operated.

Figure 1:
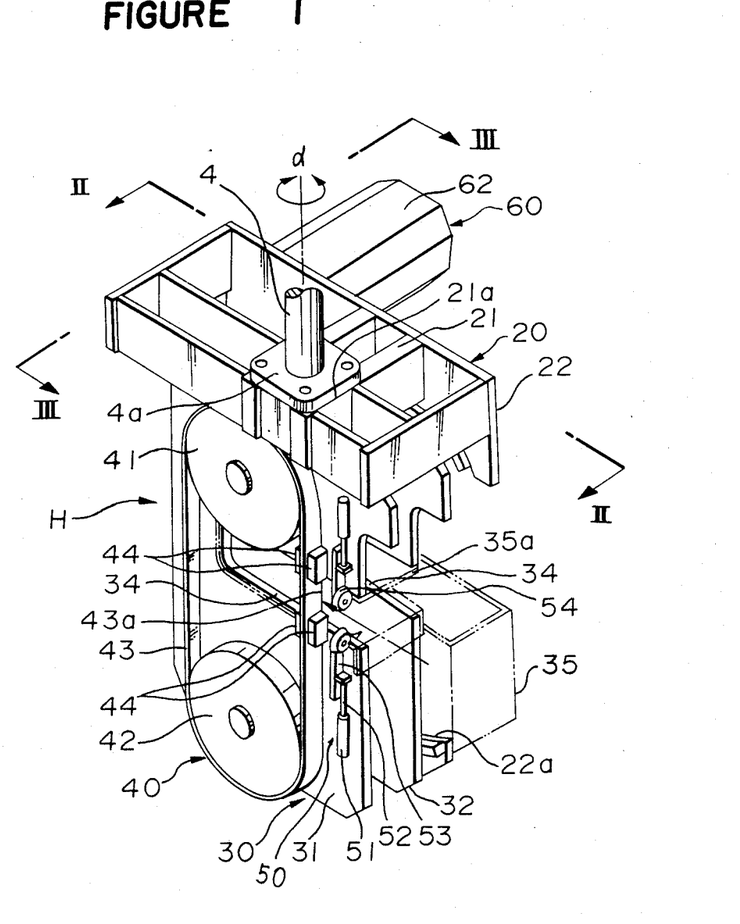
FIG. 1 is a perspective view of an embodiment of the mechanical hand for processing edges of a curved plate according to the present invention.
Figure 2:
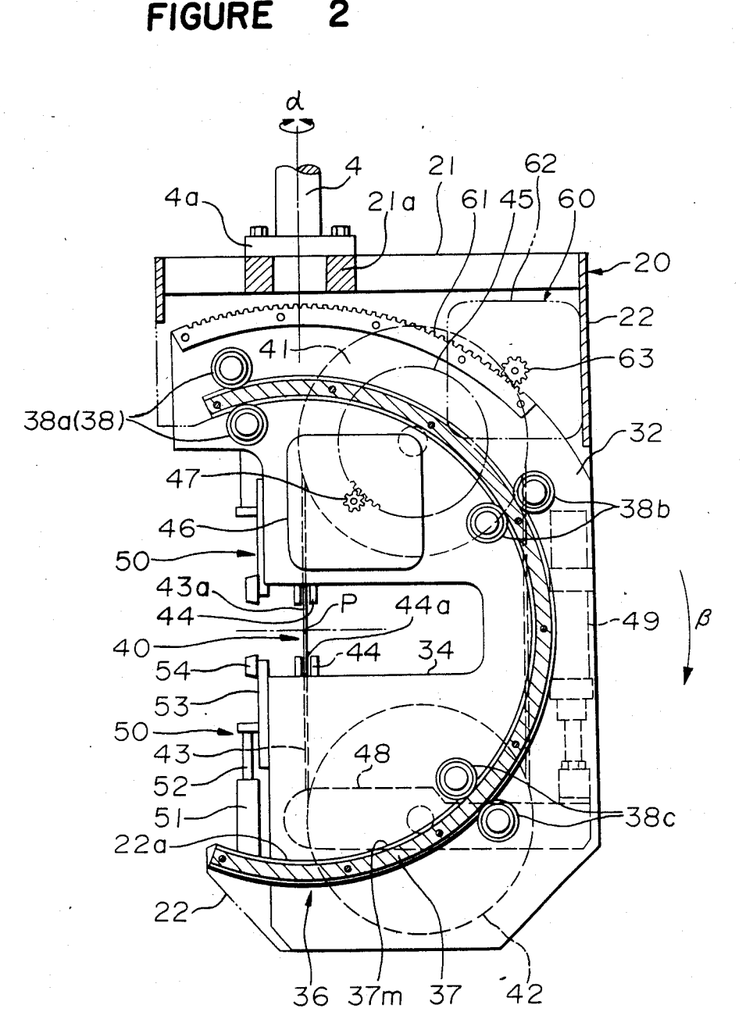
FIG. 2 is a cross-sectional view taken along a line II—II in FIG. 1.
Figure 3:
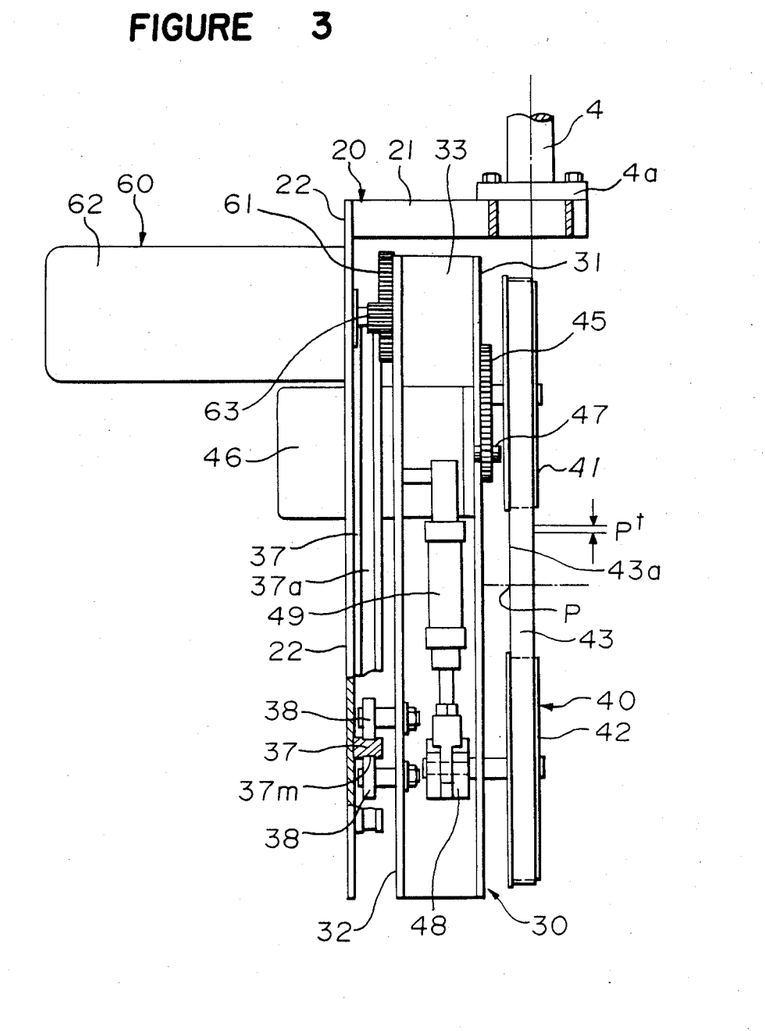
FIG. 3 is a side view from the direction of a line III—III in FIG. 1.

As shown in FIGS. 1 to 3, the mechanical hand H of the first embodiment is provided with a fixed bracket 20 fixed to the hand supporting member 4a, a movable bracket 30 attached to the fixed bracket 20 so as to be freely tiltable, a cutting tool 40 as a processing tool mounted on the movable bracket 30 which is adapted to cut end portion of the intermediary film 3 of the curved plate 1, an auxiliary cutting tool 50 which functions to provide a stable cutting operation for the cutting tool 40 and which mounted on the movable bracket 30 and a driving device 60 for driving the movable bracket 30.

Explanation will be made as to the mechanical hand in more detail. The fixed bracket 20 is generally provided with a frame base 21 having a framework of an appropriate number of steel plates which generally extends in the horizontal direction and which is secured to the hand supporting member 4a by means of screws. A supporting plate 22 extends downwardly from an end portion of the frame base 21 and a semicircular recess 22a is formed in the supporting plate 22 around the center corresponding to the point of processing P.

The movable bracket 30 is formed by connecting a pair of panels 31, 32 extending vertically and a connecting plate 33 for connecting each side of the panels 31, 32 into a channel-like shape. A notched portion 34 is formed in each of the panels 31, 32 at their intermediate portions so as not to cause interference with the edge portion of the curved plate 1. A generally channel-like cover 35a is attached to the notched portions 34. A receiving bracket 35 is fixed to the cover 35a to receive the end portion of the intermediary film 3 to be cut by the cutting tool. The movable bracket 30 is supported by the supporting plate 22 of the fixed bracket 20 by means of a supporting structure 36.

In this embodiment, the supporting structure 36 supports the movable bracket 30 so as to be capable of tilting around the point of processing P as the center of revolution. A guide rail 37 having a one-channel-arcuate track is attached to the supporting plate 22 along the inner periphery of the semicircular recess 22a. On the panel 32 forming one side of the movable bracket 30, three sets of guide rollers 38a, 38b, 38c are mounted along a coaxial circular line around the point of processing P so that the three sets of guide rollers 38 are respectively fitted to a guide groove 37m of the guide rail 37 in a freely slidable manner.

The cutting tool 40 comprises a fixed pulley 41, attached to the upper part the panel 31 of the movable bracket 30 and a movable pulley 42 attached to the lower part of the panel 31. An endless cutter 43, in the form of an endless belt, is wound around the pulley 41, 42. A sharp cutting blade 43a is formed at one side edge of the endless cutter 43.

The point of processing P is determined at a position between the notched portions 34 formed in the movable bracket 30 through which the locus of the cutting blade 43a of the endless cutter 43 extends. The point of processing P is also determined at a position on the axial line of the hand supporting member 4a of the robot arm 4. Cutter guides 44 each having a slit 44a for restricting the movement of the endless cutter 43 in its direction of width are attached respectively to the upper and lower edge portions of the notched portion 34 in panel 31.

In this embodiment, a rotational force transmitting gear wheel 45 is attached to the fixed pulley 41 with the same axis. A pulse motor 46 is attached to the movable panel 30 near the rotational force transmitting gear wheel 45 so as to be rotated stepwisely in accordance with a predetermined pulse signal. A pinion 47 is attached to the shaft of the pulse motor 46 so as to mesh with the rotational force transmitting gear wheel 45. The pulse signal from the pulse motor 46 is outputted when the robot controlling system detects the fact that the number of cutting operations for the end portion of the intermediary film 3 reaches a standard number within the range of durability of the endless cutter 43. With the pulse signal, the pulse motor 46 is turned by a predetermined angle to rotate the fixed pulley 41, whereby the endless cutter 43 is shifted by a predetermined pitch pt. The movable pulley 42 is attached to a movable member 48 which is movably supported by the panel 31 in the vertical direction. The movable member 48 is connected to an air cylinder 49 for exerting a stretching force so that, when the air cylinder 49 is operated, it moves apart from the pulley 41.

The auxiliary cutting tool 50 functions to hold the peripheral portion of the curved plate 1 in the upper and lower direction so that the position of the end portion of the intermediary film 3 of the curved plate 1 is determined at the point of processing P; thus a stable cutting operation of the cutting tool 40 is obtainable.

A pair of air cylinders 51 are provided at the upper and lower parts of the patched portion 34 formed in the panel 31. The top end of the piston rod 52 of each of the air cylinders 51 is connected to a movable part of a linearly slidable bearing 53, and a squeeze roller 54 is provided at the top end side of the movable part of each of the linearly slidable bearings 53.

The driving device 60 for driving the movable bracket 30 comprises an arcuate-shaped rack 61, a servomotor 62, and a pinion gear 63. The arcuate-shaped rack 61 is fixed to the upper part of the panel 32 constituting the movable bracket 30 where the upper part of the panel 32 is processed to have a circular recess having the same center as the point of processing P. The servomotor 62 is fixed to the supporting plate 22 of the fixed bracket 20 so as to be actuated on the basis of a predetermined control signal. The pinion gear 63 is firmly connected to the shaft of the servomotor 62. By interlocking the pinion gear 63 with the arcuate-shaped rack 61, the movable bracket 30 is tilted as the arcuate-shaped rack 61 is moved.

Figure 7:
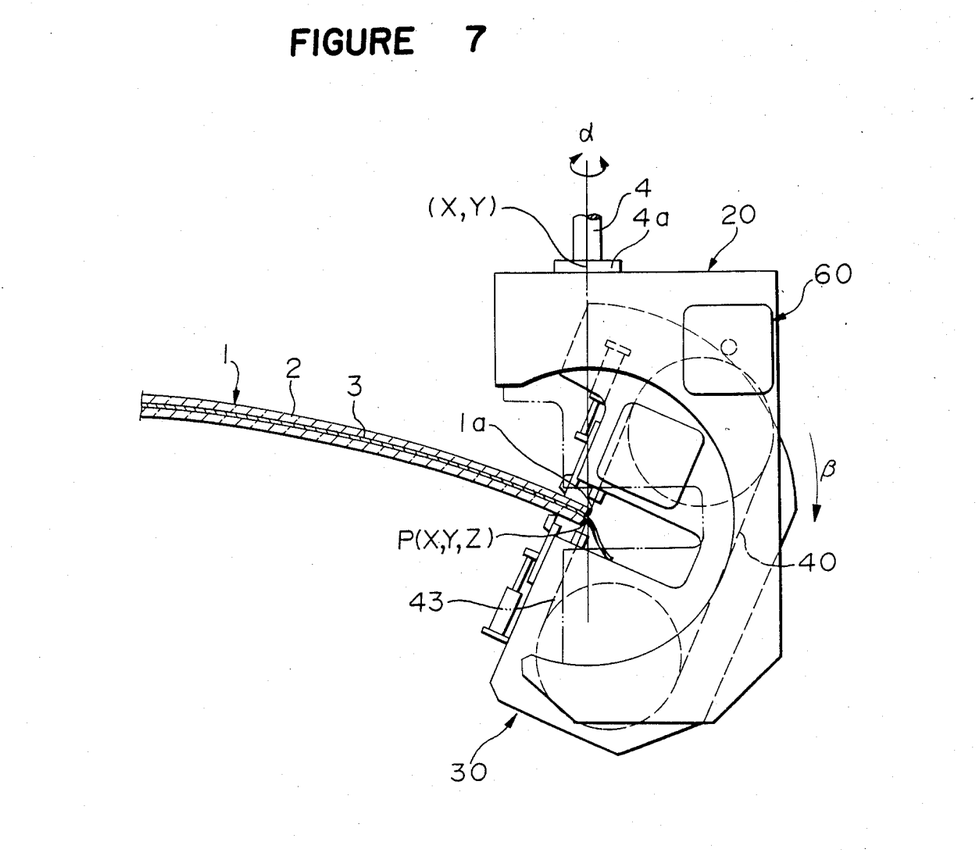
FIG. 7 is an enlarged elevation view of the part designated by a character VII in FIG. 4.

When the end portion of the intermediary film 3 of the curved plate 1 is to be cut by using the mechanical hand mounted on the industrial robot R of the present invention, the point of processing P of the mechanical hand H is moved along the circumferential edge of the curved plate 1 as shown in FIGS. 4 and 7, and the cutting tool 40 is tilted depending on the angle of inclination of the edge portion 1a to be processed of the curved plate 1.

Figure 8:
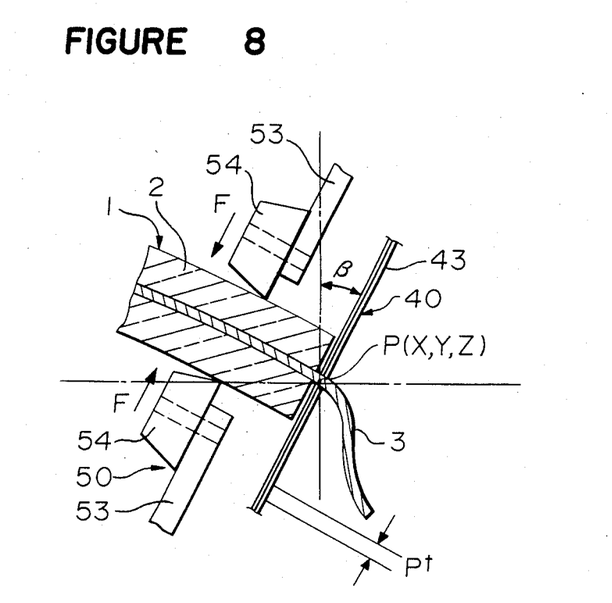
FIG. 8 is an enlarged view of the portion shown in FIG. 7 in more detail.

In the teaching work for the industrial robot R which is necessary to perform, the industrial robot to conduct the above-mentioned processing of cutting, assuming that the position of the point of processing P is represented by X, Y and Z, and an angle of inclination of the surface 1a of the edge portion to be processed of the curved plate 1 is given by an angle of rotation $\alpha$ around the axial line of the robot arm 4 and by an angle of rotation $\beta$ around an axial line orthogonal to the axial line of the robot arm 4, as shown in FIGS. 7 and 8, the hand supporting member 4a is moved to the position indicated by X, Y in the plane coordinate, and the hand supporting member 4a is turned around its axial line by an angle α. At the same time, the supporting table 1 bearing the curved plate 1 is moved so that the coordinate point in the Z axis of the surface of the edge portion 1a to be processed of the curved plate 1 is brought to Z. Further, a control signal such as an electrically operable control signal is supplied to the servomotor 62 to turn the cutting tool 40 at an angle of inclination β.

In the above-mentioned teaching work, even when the robot arm 4 is turned around the axial line of the robot arm 4 by the angle of rotation α to adjust the posture of the cutting tool 40, there is no problem of displacement of the point of processing P because the point P is determined on the axial line of the robot arm 4. Further, even when the movable bracket 30 is rotated by the angle of rotation β in the teaching work of the cutting tool 40, there is no problem of displacement of the point of processing P because the movable bracket 30 is rotated around the point P. Accordingly, it is unnecessary to adjust the coordinate of the hand supporting member 4a during the teaching work to specify the posture and position of the cutting tool 40. Thus, a teaching work for specifying the point of processing P by previously determining the plane coordinate position X, Y of the hand supporting member 4a and the vertical coordinate position of the supporting table 13 can be conducted independently of another work for specifying the posture of the cutting tool 40. In addition, the plane coordinate of the processing point P (in other words, the coordinate in projection on a plane of the curved plate 1) can be utilized as the plane coordinate X, Y of the hand supporting member 4a. Accordingly, the teaching work for the industrial robot R can be more easier.

Figure 9:
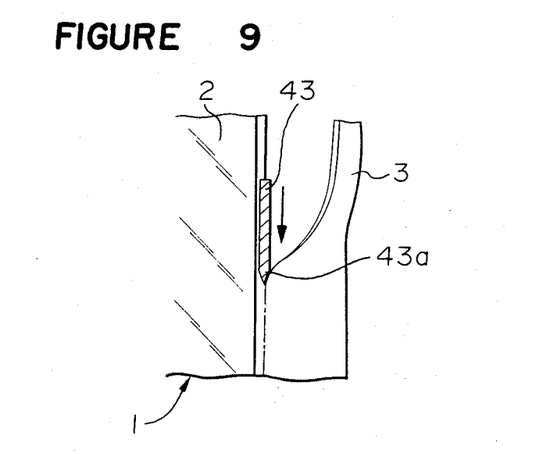
FIG. 9 is a diagram showing a portion in FIG. 8.

When a predetermined teaching work is conducted for the industrial robot R along the surface of the edge portion to be processed of the curved plate 1, the endless cutter 43 of the cutting tool 40 is successively moved along the surface of the edge portion 1a with a predetermined posture as shown in FIGS. 7 to 9. Then, cutting operation is carried out for the end portion of the intermediary film 3 extending from the end portion of the glass plate 2 of the curved plate 1. During the cutting process, when the posture of the cutting tool 40 is changed at a predetermined point of processing P, it is sufficient that only the driving device 60 of the movable bracket 30 is driven without changing the position of the hand supporting member 4 in the coordinate axis system. Accordingly, it is possible to stabilize the tilting operation of the cutting tool 40 even when an acceleration speed of moving the driving device 60 is determined to have a large value.

Further, in this embodiment, since the endless cutter 43 cuts the end portion of the intermediary film 3 while it is in a fixed state, a problem caused by using a device of a type in which the endless cutter 43 is rotated can be effectively avoided. Namely, in this embodiment, there is no deviation of the endless cutter 43 caused when it is moved, and the degree of wearing in the endless cutter 43 and the curved plate 1 can be minimized. Further, the locus of cutting in the end portion of the intermediary film 3 can be uniform. Since the endless cutter 43 is not continuously rotated, wearing of the endless cutter 43 over the entire length is avoidable. Since it is unnecessary to stabilize the movement of rotation of the endless cutter 43, accuracy in machining of connecting parts of the endless cutter 43 may be reduced. Since a load resulting from a continuous operation of the endless cutter 43 is not applied to the connecting parts, it is possible to connect them with use of a blade having a high hardness; it is therefore, possible use a sharp blade such as an industrial razor or the like.

In the first embodiment of the present invention, when the number of processing of the edge portion of the curved plate 1 reaches a predetermined number (such as 30 turns–60 turns), the endless cutter 43 is moved by a predetermined pitch pt (such as about 6 mm) inclusive of a damaged portion. Accordingly, a fresh sharp cutting blade 43a can be provided for the point of processing P so as to avoid deterioration of processing operation for the edge portion of the curved plate 1.

In the above-mentioned embodiment, the endless cutter 43 is extended between the fixed pulley 41 and a movable pulley 42 which is moved by the air cylinder 49, and the endless cutter 43 is held by a pair of the cutter guides 44 in the vicinity of the point of processing P. Accordingly, the endless cutter 43 is maintained in a stable condition at the processing point P so that the end portion of the intermediary film 3 can be certainly processed.

In the above-mentioned embodiment, the squeeze roller 54 of the auxiliary cutting tool 50 holds the peripheral portion of the curved plate 1 from the upper and lower sides in the vicinity of the processing point P. Accordingly, when the end portion of the intermediary film 3 is cut by the cutting tool 40, there is no risk that the peripheral portion of the curved plate 1 is elastically deformed, whereby the cutting operation of the cutting tool 40 can be stably peformed.

Since the auxiliary cutting tool 50 is composed of the squeeze rollers 54 which are elastically urged by the air cylinders 51, the auxiliary cutting tool 50 can follow displacement of the curved plate 1 even when accuracy in operation of the industrial robot R is reduced and the processing point P is somewhat deviated from a given position, whereby the curved plate 1 can be supported from the upper and lower direction with a uniform pressing force F. With this construction, the position of the edge portion of the curved plate 1 is primarily determined, and there is no problem that the surface of the edge portion 1a to be processed of the curved plate 1 is separated from the cutting tool 40.

Further, in the above-mentioned embodiment of the present invention, there is no possibility that the robot arm 4 extends in the direction of the Z axis because a component of movement of the industrial robot R in the direction of the Z axis is shared by the supporting table 13; thus it is unnecessary to consider the deformation of the robot arm 4 in the operation of the robot R. Therefore, it is unnecessary to design the structural rigidity of the robot arm 4 to be large; thus the weight of the robot arm 4 is reduced to thereby minimize the size of the robot R.

Figure 10:
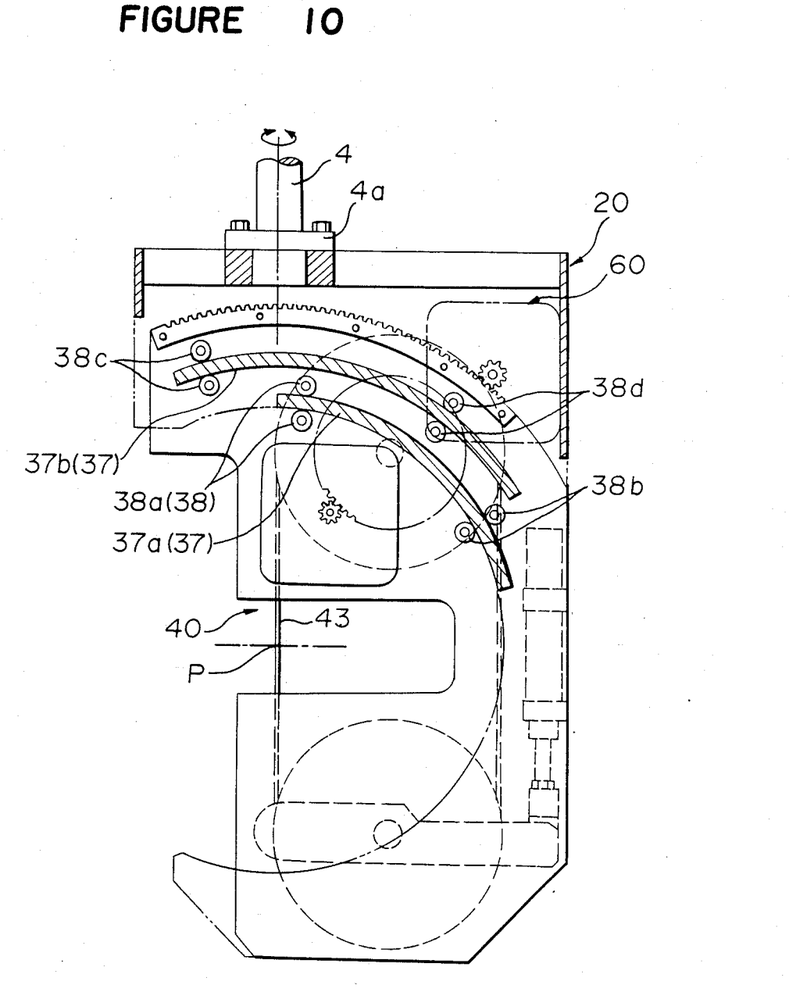
FIG. 10 is a diagram showing another embodiment of the mechanical hand for processing edges of a curved plate of the present invention.

In the above-mentioned embodiment, many modifications can be attained. For instance, as shown in FIG. 10, the supporting structure 36 for the movable bracket 30 may be constituted by two guide rails 37 (i.e. 37a, 37b) provided on the coaxial circular track around the processing point P and guide rollers 38 (i.e., 38a, 38d) respectively engaged with the guide rails 37 (37a, 37b).

As described above, in accordance with the present invention, the posture of the processing tool can be changed without changing the position of the point of processing so as to correspond to the edge portion of the curved plate. Accordingly, it is unnecessary to adjust the position of the hand supporting member of the robot arm when the posture of the processing tool is changed as is necessary in the conventional mechanical hand, with the result that the position of the curved plate in projection on a plane in a coordinate axis system can be utilized as a locus obtained in the teaching work for the hand supporting member of the robot arm; thus, the teaching work for the robot can be carried out more easily.

Further, in accordance with the present invention, the movable bracket can be solely tilted without causing change in displacement of the hand supporting member in the coordinate axis system when the posture of the processing tool is changed; the edge portion of the curved plate can be processed at a predetermined point of processing. Accordingly, it is unnecessary to control an acceleration speed to move the robot to cause displacement of the hand supporting member in the coordinate axis system, with the consequence that an acceleration speed for the tilting movement of the movable bracket can be determined to be large. This assures a great reduction of time for processing the edge portion of the curved plate. Further, it is possible to follow effectively the posture of the cutting tool in accordance with change of an inclination angle of the edge portion to be processed of the curved plate.

We claim:

1. Apparatus for processing edges of a curved plate, said apparatus comprising:
   (a) a robot arm having an axial line and a distal end;
   (b) a movable bracket supported by said robot arm so as to be capable of tilting around a point of processing which is on the axial line of said robot arm and which is on the edge of a curved plate being processed;
   (d) a processing tool mounted on said movable bracket in position to face the edge of a curved plate being processed at said point of processing; and
   (e) a driving means for causing said movable bracket to tilt:
      (i) so that the posture of said processing tool coincides with a surface of an edge of a curved plate being processed at said point of processing;
      (ii) so that, when said robot arm is turned around the axial line of said robot arm to adjust the posture of said processing tool, said point of processing remains on the axial line; and
      (iii) so that, when said movable bracket is tilted relative to said robot arm, said point of processing is not displaced, whereby it is unnecessary to adjust the coordinates to the distal end of said robot arm during a teaching operation to specify the posture and position of said processing tool.

2. Apparatus as recited in claim 1 wherein:
   (a) said movable bracket is pivotably attached to a fixed bracket;
   (b) said fixed bracket is mounted on a hand supporting member; and
   (c) said hand supporting member is attached to the distal end of said robot arm.

3. Apparatus as recited in claim 2 wherein said movable bracket is attached to said fixed bracket by means of a supporting means comprising:
   (a) a guide rail having a part circular arcuate track attached to said fixed bracket, said arcuate track being centered on said point of processing, and
   (b) a plurality of guide rolls mounted on said movable bracket and in rolling contact with said arcuate track.

4. Apparatus as recited in claim 1 wherein said processing tool comprises:
   (a) an endless cutter and
   (b) advancing means for advancing said endless cutter by a predetermined amount.

5. Apparatus as recited in claim 4 wherein said advancing means advances said endless cutter after a predetermined number of cutting operations.

6. Apparatus as recited in claim 3 and further comprising:
   (a) a supporting table for supporting curved plates,
   (b) moving means for moving curved plates relative to said supporting table; and
   (c) an electrically operable numerical control and driving device for controlling said supporting table and said robot arm.

7. Apparatus as recited in claim 6 wherein:
   (a) said driving means is adapted to move said robot arm in the direction of X and Y axes relative to the edges of curved plates and
   (b) said moving means is adapted to move curved plates relative to said supporting table in the direction of a Z axis relative to the edges of curved plates.

* * * * *